United States Patent
Neerincx et al.

(10) Patent No.: US 9,636,646 B2
(45) Date of Patent: May 2, 2017

(54) LAYER MULTIPLIER FOR FLUIDS WITH HIGH VISCOSITY

(75) Inventors: Peter Neerincx, Gasthuisstraat (NL); Sven Peelen, Heezerweg (NL)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 13/979,530

(22) PCT Filed: Jan. 11, 2012

(86) PCT No.: PCT/EP2012/050375
§ 371 (c)(1),
(2), (4) Date: Jul. 12, 2013

(87) PCT Pub. No.: WO2012/095457
PCT Pub. Date: Jul. 19, 2012

(65) Prior Publication Data
US 2013/0301379 A1    Nov. 14, 2013

(30) Foreign Application Priority Data
Jan. 12, 2011    (SE) ...................................... 1150017

(51) Int. Cl.
*B01F 5/06* (2006.01)
*B01F 13/10* (2006.01)
(Continued)

(52) U.S. Cl.
CPC .......... *B01F 5/0604* (2013.01); *B01F 5/0644* (2013.01); *B01F 13/1016* (2013.01);
(Continued)

(58) Field of Classification Search
CPC .... B01F 5/0682; B01F 5/0604; B29C 47/707; B29C 47/0009
(Continued)

(56) References Cited

U.S. PATENT DOCUMENTS 3,195,865 A * 7/1965 Harder .................. B01F 5/0641
366/337
3,857,551 A * 12/1974 Troy ....................... B01F 5/064
366/336
(Continued)

FOREIGN PATENT DOCUMENTS

EP    1795801 A1    6/2007
GB    2079614 A    1/1982
(Continued)

OTHER PUBLICATIONS

International Search Report for International Application No. PCT/EP2012/050375, dated Apr. 19, 2012, (3 total pages).
(Continued)

*Primary Examiner* — Tony G Soohoo
*Assistant Examiner* — Anshu Bhatia
(74) *Attorney, Agent, or Firm* — Finnegan, Henderson, Farabow, Garrett & Dunner, LLP

(57) ABSTRACT

A layer multiplier (100) is disclosed. It comprises an inlet (102) for a flow of multilayered flowable material, a distribution manifold (104) into which the inlet debouches, a number >2 of separate splitting channels (106) extending from the distribution manifold, a recombination manifold (108) into which the splitting channels debouch, an outlet in one end of the recombination manifold, and the distribution manifold is arranged in an opposing relationship with the recombination manifold.

17 Claims, 6 Drawing Sheets

(51) Int. Cl.
  *B29B 7/32* (2006.01)
  *B29C 47/70* (2006.01)
  *B29C 47/00* (2006.01)

(52) U.S. Cl.
  CPC .......... *B29B 7/325* (2013.01); *B29C 47/0009* (2013.01); *B29C 47/707* (2013.01)

(58) Field of Classification Search
  USPC ........................................ 366/336, 337, 338
  See application file for complete search history.

(56) References Cited

U.S. PATENT DOCUMENTS

| 4,087,862 | A | | 5/1978 | Tsien |
| 4,222,671 | A | * | 9/1980 | Gilmore ........................ 366/337 |
| 4,361,407 | A | | 11/1982 | Pellegrini |
| 6,629,775 | B2 | * | 10/2003 | Choikhet ................ B01F 5/064 366/336 |
| 7,255,928 | B2 | | 8/2007 | MacKerron et al. |
| 2002/0021620 | A1 | | 2/2002 | Choikhet et al. |
| 2003/0165081 | A1 | | 9/2003 | Mizutani et al. |

FOREIGN PATENT DOCUMENTS

| WO | WO-2010/016448 A1 | 2/2010 |
| WO | WO-2010/099884 A1 | 9/2010 |

OTHER PUBLICATIONS

Office Action mailed on Oct. 26, 2015, in counterpart Japanese Patent Application No. 2013-548828, by the Japanese Patent Office and English-language translation (10 Pages).

* cited by examiner

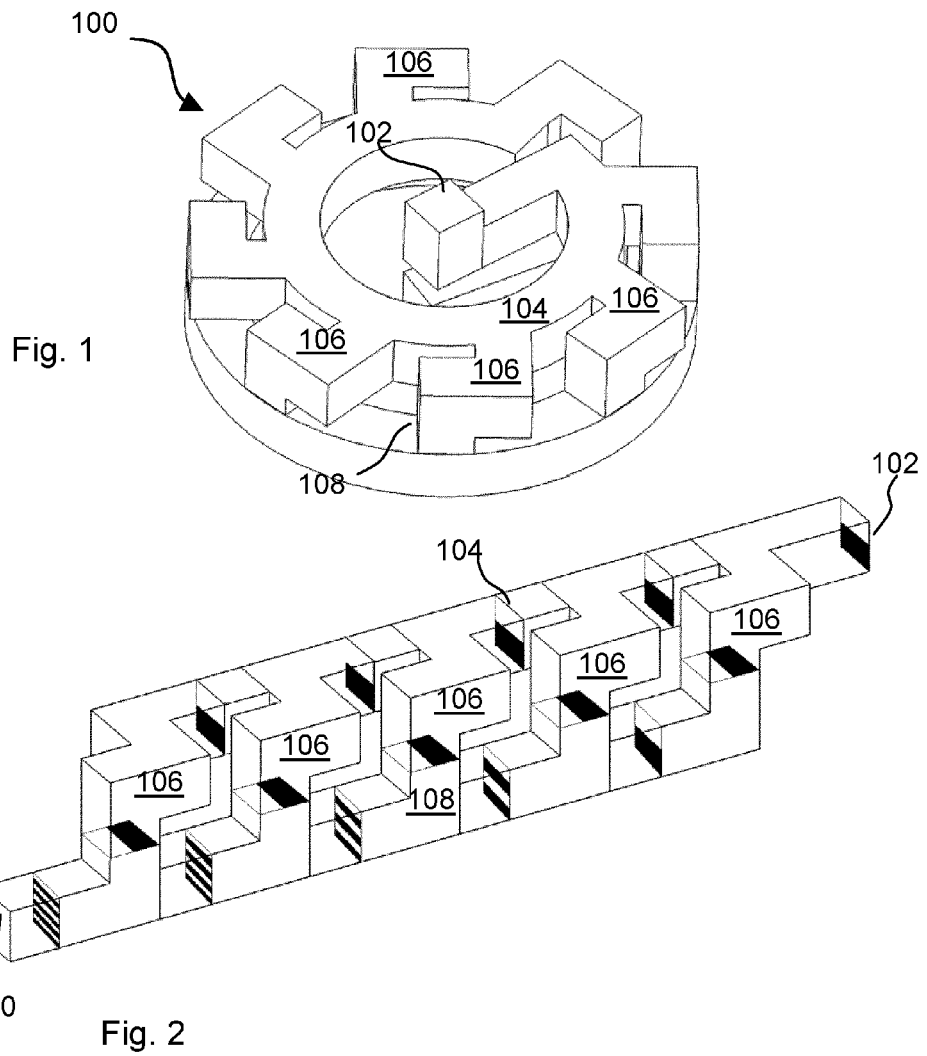

LAYER MULTIPLIER FOR FLUIDS WITH HIGH VISCOSITY

CROSS-REFERENCE TO RELATED APPLICATIONS

This is a U.S. National Phase of PCT/EP2012/050375, filed Jan. 11, 2012, which claims the benefit of priority to Swedish Patent Application No. 1150017-0, filed Jan. 12, 2011, which is incorporated herein by reference

FIELD OF THE INVENTION

The present invention relates to a layer multiplier, or static mixer, for high-viscosity fluids. In the context of this application "layer multiplier" is more descriptive of the inventive purpose, yet the inventive device may be used as a static mixer too. Static mixers are widely used to mix fluids.

In mixing and layer multiplication of a stream, use may be made of splitting, stretching, folding and stacking, performed as steps in a procedure. The skilled person is well aware of this terminology in the present field; still a short explanation follows, in the context of the baker's transformation. In the baker's transformation a "dough" ("flow" in the following) comprising two layers, e.g. a black layer and a white layer, is transformed into a flow having multiple layers of each color. The flow may be stretched, resulting thinner layers, and the thinner flow may be split into several smaller flows, which may be stretched to form thinner layers, and subsequently folded onto each other, or cut and stacked onto each other. Considering a case where the stretched flow comprises a black bottom layer and a white top layer a folding step will result in a four layer structure with outermost layers of the same color and innermost layers of the same color (black-white-white-black or white-black-black-white), while a cutting and stacking step will result in a four layer structure with adjacent layers having different colors (black-white-black-white or vice versa). Cutting and stacking may thus be considered more efficient in a mixing perspective and it also results in layers of equal thickness (in an ideal situation and for this particular flow). The above steps may be performed in any preferred order. A "Layer multiplier" or a "Static Mixer" may be one and the same device, and the term used depends on the intended use in that specific case. For example: U.S. Pat. No. 4,087,862A and US2003/165081A1 disclose different versions of static mixers, which serve their purpose as mixers well, yet they are not suitable for use as layer multipliers.

In a practical case the process of multiplying layers may commonly be performed as part of an extrusion mechanism, by having materials follow an intricate path through a die element. One example is illustrated in U.S. Pat. No. 7,255,928. Therein it is described how a three layered flow led through a channel is divided along the middle (a cut), parallel to the flow direction and orthogonal to the layers. The cross section of each of the two channels is reduced to half by having either the top (for one channel) or the bottom (for the other channel) slope downwards or upwards until it reaches half the original height (a stretch). In the next step each of the two channels assumes the full original width, and the two flows are recombined (a stack). The procedure is performed by a die element, and by using die elements in a modular setup the number of layers may be increased. In the described solution the number of layers is doubled for each die element, which is typical for layer multipliers. The skilled person realizes that by splitting the flow into more than two flows may increase the multiplying factor, yet the skilled person also realizes that the complexity of the constructional element would increase significantly. One example of a more complex construction is disclosed in EP-0492890. Die elements often have a modular setup, in more than one meaning. An individual die element may be constructed from a number of modules, e.g., a splitting module, a stretching module, a recombination module. One reason may be that this enables complex die elements to be constructed from straightforward base elements, which may be comparatively easy to construct (machine). Die elements are also modular in the sense that they may be connected to each other, either directly or with a coupling element arranged in between. In this way an end user may chose the amount of mixing (or multiplication of layers) occurring, within the constraints of the properties of the die elements.

If the efficiency in layer production is one factor, pressure consumption is another. The pressure consumption represents the pressure drop over the layer multiplier, and roughly put a more complex geometry will result in higher pressure consumption, resulting in an increased power consumption and increased shear stresses. The relevant figure in this matter is the pressure consumption per layer in the resulting multilayer structure. Also, the residence time, i.e. the time during which the polymer is located inside the layer multiplier may be of importance. Longer residence times may result in unwanted processes occurring, such as polymer degradation.

For multilayer structures comprising a few to a couple of hundred layers existing techniques as exemplified above have proven to be adequate. For efficient manufacture of multilayer structures where the thickness of an individual layer approaches the crystal size region, there is still room for improvement. The present invention aims at providing an improved layer multiplier addressing these issues.

SUMMARY

The present invention relates to a layer multiplier for high-viscosity fluids such as polymer melts.

To this end an inventive layer multiplier, or static mixer, comprises an inlet for a flow of multilayered flowable material, a distribution manifold into which the inlet debouches, a number (>2) of separate splitting channels extending from the distribution manifold, a recombination manifold into which the splitting channels debouch, an outlet in one end of the recombination manifold. The distribution manifold is arranged in an opposing relationship with the recombination manifold, in the sense that the two manifolds faces each other and that the recombination manifold is shifted in a direction normal to an interface surface between adjacent layers of the multilayered flowable material in the distribution manifold.

The combination of features of the present invention offers a robust and reliable layer multiplier, where the distribution manifold is folded over (or under) the recombination manifold. This solution enables a layer multiplier which is efficient in layer production while having a moderate extension in any dimension. As will be obvious from the following detailed description the present layer multiplier may have a larger diameter than known layer multipliers, yet the length will be significantly shorter (for a layer multiplier of equal performance). The present invention thus offers a more compact design for layer multipliers than prior art. As the multilayered flowable material enters the first multiplier step it may consist of two layers only, yet a higher number of layers may be present in the first step, and already in the next step the number of layers has increased significantly.

In one or more embodiments the splitting channels may be distributed along a length of the distribution manifold, in sequential manner in an intended flow direction of the flowable material. The feature of distributing the splitting channels (or rather the inlets thereof) along the length of the distribution manifold enables a predictable and steady flow through the layer multiplier and also enables a space efficient solution.

In one or more embodiments the splitting channels may also be distributed along a length of the recombination manifold, in sequential manner an intended flow direction of the flowable material. This results in the same benefits as the corresponding feature of the distribution manifold. Combined these features make it easy to verify that the path length of each possible flow path through the layer multiplier, and to make these equal. Another parameter is that it facilitates a modular construction of the layer multiplier.

In one or several embodiments the splitting channels are distributed along a remote end of the distribution manifold relative to the inlet. In an embodiment comprising this feature the flow may follow a direct path to each of the splitting channels. This solution is space efficient and enables a simple geometry for the layer multiplier. To put this solution into perspective the previous embodiments offer solutions where the distribution manifold may have the shape of a channel, along which the splitting channels are arranged in series such that a melt may reach one splitting channel after the other on its way through the distribution manifold. For the present embodiment, however, the splitting channels are arranged basically in parallel along a curved path at a wall remote from the inlet. The curved path should preferably be so arranged that the length of a flow path from the inlet to the outlet of the layer multiplier should be essentially equal, irrespective of the choice of splitting channel. In case of perfect symmetry all channels could have been reached (by a melt) simultaneously, yet this is not the case for the illustrated embodiment, even if the flow path between the inlet and of some of the splitting channels may be equidistant. In some embodiments, to be described, the same layout is used for the recombination manifold. For better understanding of the latter embodiments "inlet" may be replaced by "outlet" in the above description.

In one or several embodiments there are >2, such as 3, 4, 5, 6, 7, 8, 9, 10 or more separate splitting channels extending between each distribution manifold and the corresponding recombination manifold. In one or several embodiments there are 4-8 splitting channels per pair of distribution manifold/recombination manifold.

In one or several embodiments the layer multiplier has an overall curved shape with the inlet and the outlet respectively arranged radially inside of the splitting channels. This arrangement is space efficient in that the larger number of splitting channels may be arranged along the circumference of the layer multiplier and that the space available in the middle may be utilized for inlet(s) and outlet(s). It also facilitates stacking of several layer multipliers, one on top of the other, in a natural fashion.

For one or more embodiments it has proven to be beneficial for the multiplier to comprise two identical halves arranged in a 180° relationship, each half comprising a distribution chamber, splitting channels, and a recombination chamber. Using two identical halves basically cuts the average path length for a flow path through the layer multiplier in half. This shortens residence times and reduces the pressure drop. The output from each of the halves is preferably combined (stacked) before the multilayered structure enters a consecutive multiplying step.

In any one of the above or below embodiments the shape of the recombination chamber corresponds to the shape of the distribution chamber, preferably such that there shapes are identical. This offers a predictable behavior of the layer multiplier and facilitates balancing of the system. The feature obviously also has advantages from a manufacturing standpoint. In one or more embodiments the total number of splitting channels corresponds to 2-20, such as 4, 8, 12, 16 or 20, implying 2, 4, 6, 8 or 10 per distribution channel in the recently mentioned embodiment.

The present invention also relates to a layer-multiplier assembly, comprising several layer multipliers of any preceding or later embodiment arranged on top of each other, optionally provided with a coupling element therebetween. In some embodiments the adjacent layer multipliers in the assembly may be rotated 90°, which simplifies coupling in relation to the orientation of the multilayer structure processed in the assembly.

The present invention may also relate to a method for manufacture of a multilayer polymer structure using the inventive device according to any embodiment thereof.

BRIEF DESCRIPTION OF THE DRAWINGS

FIG. 1 is a schematic perspective view of a layer multiplier in accordance with a first embodiment of the present invention.

FIG. 2 is a fold-out perspective view of the layer multiplier of FIG. 1

DESCRIPTION OF EMBODIMENTS

Figure 5A:
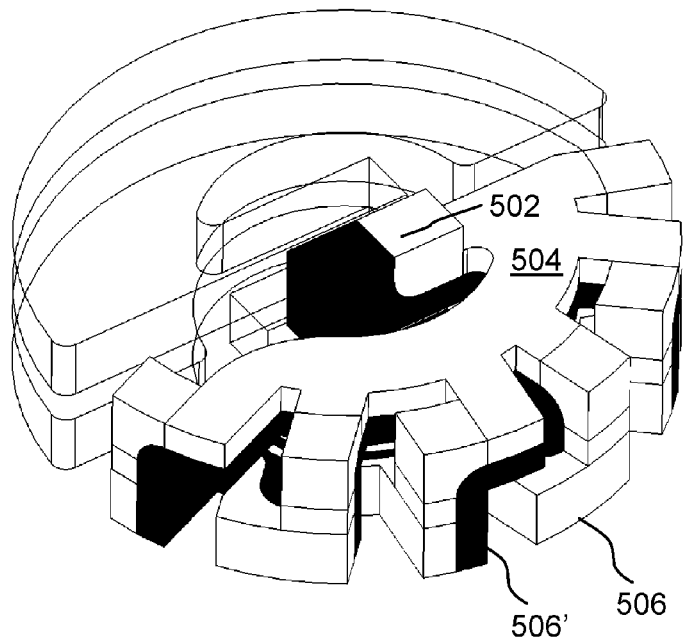
FIGS. 5a-b illustrates a layer multiplier in accordance with a fourth embodiment of the present invention.
Figure 5B:
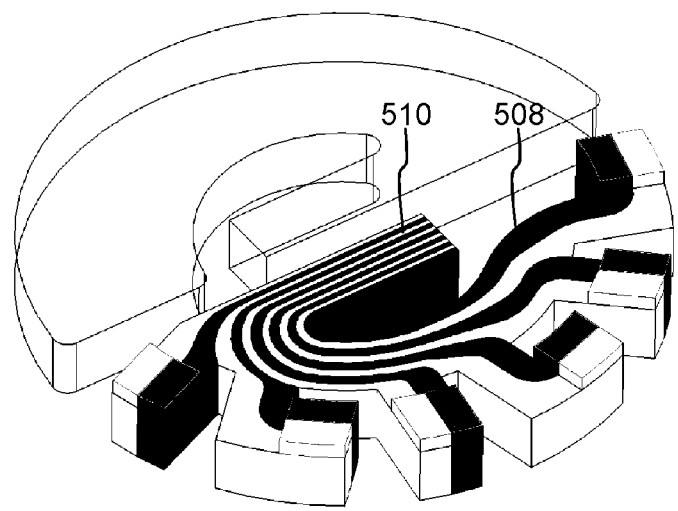
Figure 6A:
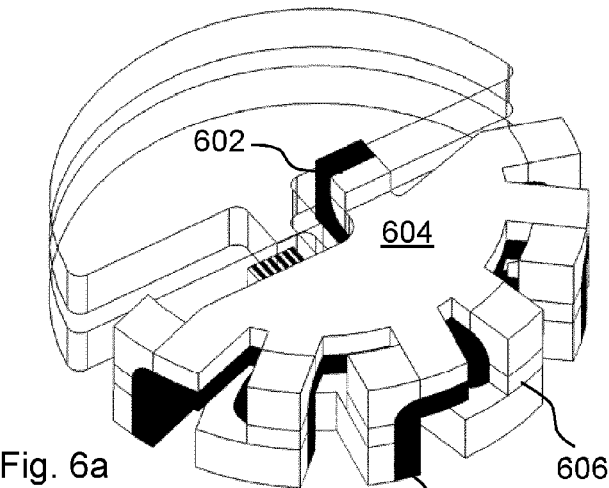
FIGS. 6a-b illustrates a layer multiplier in accordance with a fifth embodiment of the present invention.

A number of embodiments of the present invention will now be described in reference to the appended drawings. The geometry of a majority of the drawings is rather complex and for that reason, and in order to facilitate understanding to the benefit of a reader, a fictive mixing process has been indicated in those drawings. The fictive mixing process involves a black compound and a white compound, and representative cross sections are indicated in some of the drawings (FIGS. 2, 3 and 4), and in other drawings (FIGS. 5 and 6) the flow is instead indicated.

FIG. 1 illustrates a layer multiplier 100 in accordance with a first embodiment of the present invention. The fluid, in the presently preferred use a polymer melt, enters the mixer from an inlet 102 at the top and subsequently flows through a curved channel 104, forming the distribution manifold, meanwhile splitting into the splitting channels 106, which are distributed along the length of the distribution manifold 104. Note that reference numbers have not been indicated for all splitting channels 106. In the present embodiment there are eight splitting channels 106, thus creating eight parallel flows. These eight flows are directed downwards to allow recombination in a second curved channel, the recombination manifold 108, having a larger radius than the first one 104. In the recombination manifold the split-off flows are recombined sequentially along the length of the manifold 108. This geometry constitutes one mixing element that produces 16 layers from the original 2, before it exits the outlet 110 (see FIG. 2). Identical elements can be added below, to finalize the mixer, each time multiplying the number of layers by a factor 8. In a practical example the two layers will be separated along a horizontal surface as they pass through the distribution manifold 104, which will result in proper stacking as the flows are recombined in the recombination manifold. It is apparent from the layout that stacking of several layer multipliers 100 is readily achievable. FIG. 2, see below, is provided to simplify the understanding of the present embodiment, and for the same reason the same reference numbers have been used.

FIG. 2 illustrates a fold-out view of the semi-parallel mixer of FIG. 1 where a fluid enters in the top right corner 102 with a horizontal interface between the two (or more) layers; next it is split from the distribution manifold 104 into multiple parallel channels 106 directing to flow outwards and then downwards; in the downward flow the lower channel 108 recombines the flow streams. This mixing or layer-multiplying operation may be phrased as semi-parallel only, given its unequal flow lengths from entrance to each splitting channel and unequal flow lengths from splitting channels to the exit. In the folded out linear case the total length of all possible parallel flow lengths from entrance to exit is identical and, therefore, the resulting layer distribution is uniform and the striations are identical in thickness, at least once a stationary flow situation is reached and in the ideal case of fully lubricated boundaries (perfect wall slip). In the practical case of FIG. 1 this is not true, since the distribution manifold 102 and the recombination manifold 108 are arranged at different radii.

In the layer multiplier of FIG. 1 the fluid enters via the top, is guided via the top curved channel 104 into the downward, parallel, channels 106, and recombined in the lower curved channel 108. It is apparent from FIG. 1 that the fluid has to flow over the full 360° before it reaches the last parallel channel and the outlet 110. A long path length may be detrimental in some situations, since it as a rule prolongs the residence time. This path length can be reduced by splitting the entrance flow into two parts perpendicular to the interfaces, thereby not disturbing their orientation, as is shown in FIG. 3a-c.

Figure 3A:
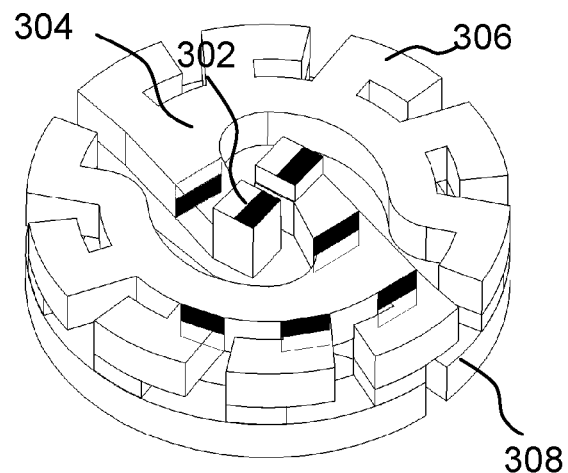
FIG. 3 is a schematic perspective view of a layer multiplier in accordance with a second embodiment of the present invention from above (a); from above with a top portion of the multiplier removed (b); and from below (c).
Figure 3B:
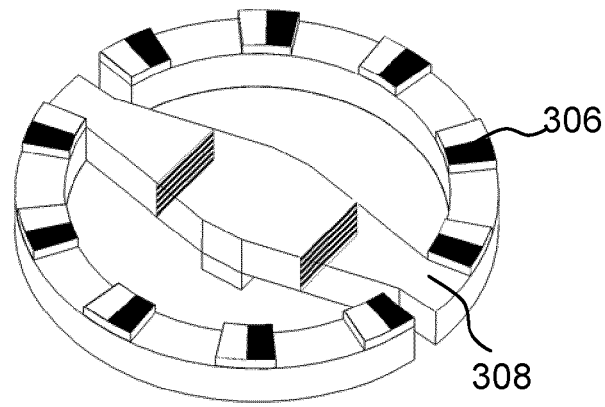
Figure 3C:
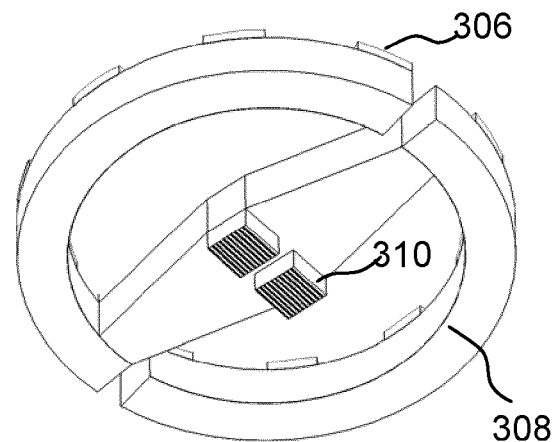

Here, the flow is split into two upon entering the mixer in the center (FIG. 3a). Next, each flow is split into five splitting channels 306 arranged along the length of the distribution manifold 304, much as was the case for the previous embodiment. In order to better illustrate the recombination process the top portion of the layer multiplier has been removed in FIG. 3b. Each operation half of this layer multiplier thus forms a 10 layered structure from a 2 layered structure, and at the outlet the two separate flows are combined, as is visualized in the view of FIG. 3c, where it is also shown how the flow has been split as a preparation for entering a consecutive layer multiplier element of the same design. This layer-multiplier may form one element of the mixer that consists of a number of n elements in total, resulting in $2*10^n$ layers. This gear ratio far exceeds known layer-multipliers while still maintaining a geometry which is not very complex.

It is a fundamental rule that if a fluid can choose different parallel paths, it takes the one with the lowest resistance. Therefore, to obtain uniformity in layer thickness distribution, it is important that all parallel flow paths within the layer multiplier have the same length, which is clearly not the case in the embodiment of FIG. 3, e.g. this is obvious by comparing the flow path for a fluid branching of at the first splitting channel (furthest upstream) with the flow path for a fluid branching of at the last splitting channel (furthest downstream), the underlying reason being that the top curved channel, the distribution manifold 304, follows a smaller radius than the lower curved channel, the recombination manifold 308.

Figure 4A:
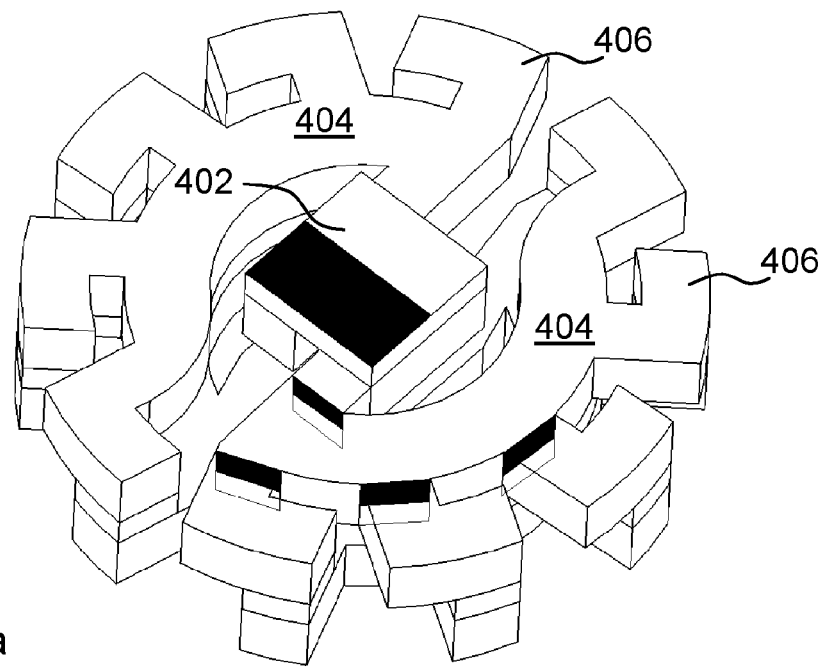
FIG. 4 is a perspective view of a layer multiplier according to a third embodiment of the present invention from above (a); and from above with a top portion of the multiplier removed (b).
Figure 4B:
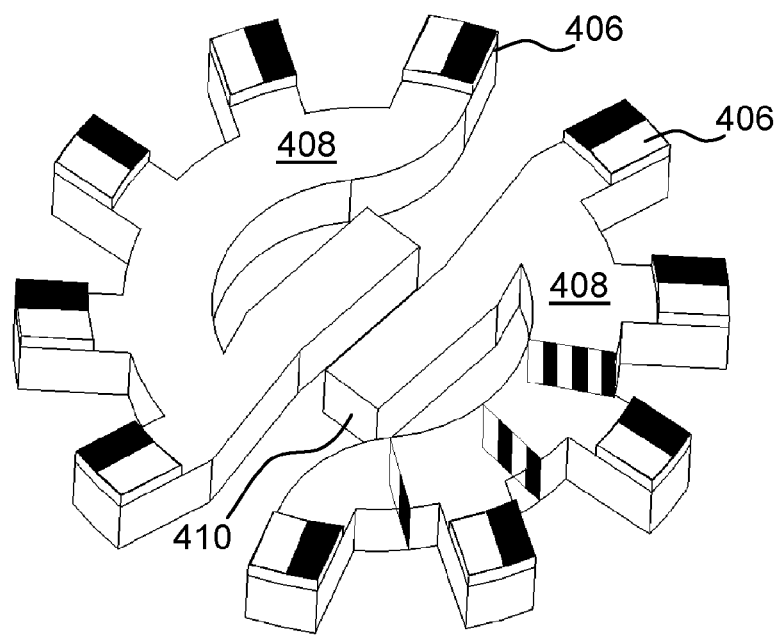

In the embodiment of FIG. 4 the distribution manifold 404 and the recombination manifold 408 have been given the same diameter, thus creating a balanced mixer or layer multiplier 400. However, shifting the collecting curved channel in the bottom part of an element (the recombination manifold) to a smaller diameter creates a considerable amount of unused space between the splitting channels 406, which may be deduced from FIG. 4. One solution to this problem is provided in the embodiment illustrated in FIG. 5. By letting the splitting channels 506 make their turn alternating in the top or in the bottom plate of an element (i.e. in the plane of the distribution manifold or in the plane of the recombination manifold), adjacent splitting channels 506, 506' may be given a complementary shape, as shown in FIG. 5. Referring again to FIG. 4, the fluid now experiences in travelling through one half of an element of the mixer the following history:

(i) The flow is split into two streams (at the entrance of the element)
(ii) each stream enters an upper curved channel prior to and is split into five parallel flows,
(iii) each parallel flow is directed downwards,
(iv) all parallel flows recombine (are stacked) in a lower curved channel into a single stream,
(v) the two stream recombine (at the exit of the element) and are led into any downstream element.

To accomplish step (iii) in a space-efficient way the split channels alternately follows one of two paths: (1) Radial, orthogonal, tangential, radial, for channel 506 or (2) Radial, tangential, orthogonal, radial, for channel 506' which is clearly visible in FIGS. 5a and 5b. The six split channels for each half of a layer multiplier provides in total $2*12^n$ layers for n elements.

The results of this design are rather promising. Improvements are now sought in reducing the unnecessary unused space in the cross section of the mixer by shortening all path lengths in order to decrease the pressure consumption, necessary to sustain the flow. To recollect the previous description, in the layer multiplier of FIG. 1 the fluid has to flow from the center to the circular path in the curved channel in the top part of an element where it is split, turned and recombined in another curved channel following a second circular path in the bottom part of an element from where the fluid flows back to the center, and in the layer multipliers of FIGS. 3-5 this path length is basically cut in half.

Figure 6B:
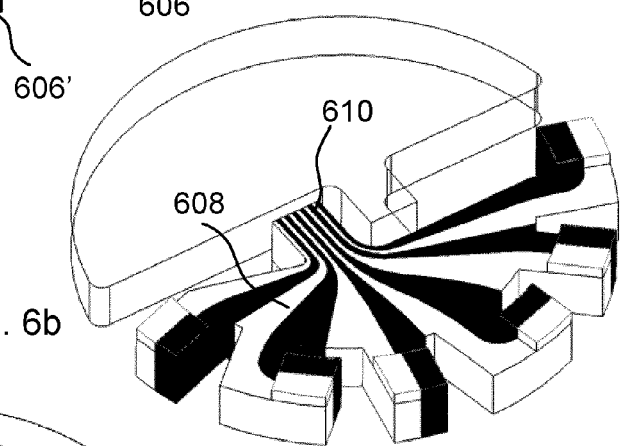

Still, this is a pressure consuming path to follow and the in the embodiment of FIG. 6 the fluid is allowed to flow from the center directly to the different parallel split channels 606. The path length from the inlet 602 to a parallel split channel 606 at the outer rim may be different for each channel. Especially the far left and far right channels have a large difference in path length. However, in the bottom part of the same element, the opposite is true and this channel now has the shortest distance to the center outlet, see FIG. 6b. Therefore, the only difference in path lengths that has to be mutually compared is that of the total flow length in the outer parallel channels and those in the middle parallel channels. A slightly eccentric design based on an ellipse rather than a circular shape offers a possible solution to this problem. FIG. 6 thus illustrates a fully parallel design of a compact layer multiplier where fluid flows directly from the inlet 602 in the center to the parallel splitting channels 606.

Figure 6C:
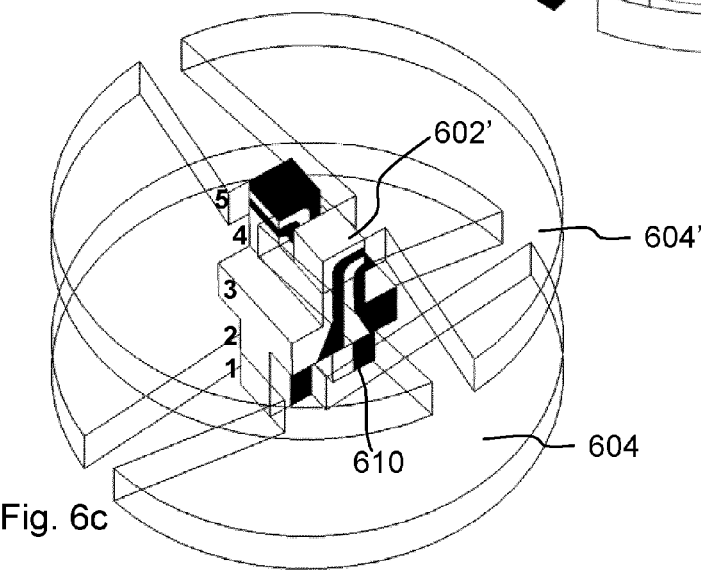
FIG. 6c illustrates a coupling element which may be used to couple layer multipliers of the fifth embodiment and which may be integrated in the layer multiplier or supplied as a separate piece.

The coupling between different mixing elements requires a slightly more complex structure, which is described referring to FIG. 6c. The first layer (1) of this element illustrates how the outflow of the bottom mixer element is directed vertically, to allow the two streams to be combined in the second layer (2). Layer (3) starts the preparation of the splitting of the two streams in the next (rotated) layer multiplier by increasing the height of the channel, while layer (4) reduces the width of the channel. Layer (5) is the 90° rotated top part of the layer multiplier of FIG. 6a. The careful reader will notice that the number of striations of black and white fluid in FIG. 6c is fictional, and it only serves to illustrate the interface orientation during passage of this coupling element. The use of a radial flow (radial outflow followed by a radial inflow) and a continuous stretching of the interface between the layers facilitate stabilization of flows.

Figure 7:
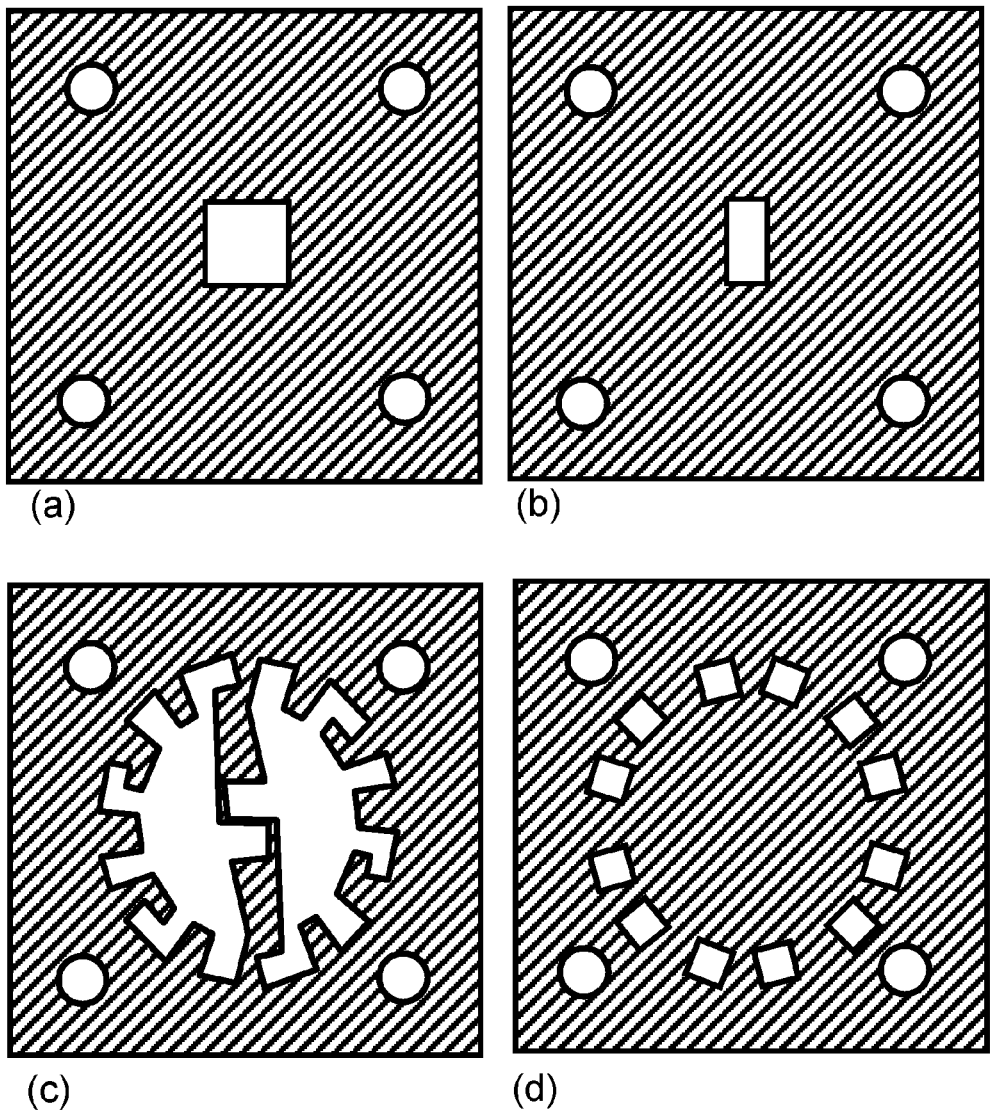
FIG. 7 illustrates plate elements used to form a layer multiplier of one embodiment of the present invention.

All drawing disclosed in the present invention illustrates the space available for the melt, rather than the outside boundaries of the device itself. The system of manifolds and channels may be machined from a homogenous piece of material, and it is apparent from the drawings that by machining in three plates of material according to a suitable pattern the layer multiplier may be formed by assembling the three plates. For the embodiments where the distribution manifold and the recombination manifold are identical, only two types of plates are needed. Additional plates may form coupling elements, and by assembling all plates a sturdy and reliable layer-multiplier assembly may be formed, which offers high multiplication factors per length, as compared to present layer-multipliers or static mixers. This is further illustrated in FIG. 7, where plates or elements for forming a layer multiplier (or even layer-multiplier assembly) according to the fourth embodiment of the present invention. In FIG. 7 four different elements are shown, and they are better understood when studied in conjunction with FIG. 6. It should be emphasized that the drawings do not illustrate blue-print reproductions, but should be seen as illustrative only. White spaces represent through openings, and the white circle in each corner are bores used when assembling several plates. The bores of all plates will line up, such that screw means or other clamping means may be arranged in the thus created through-opening. Each plate has an extension in the dimension not visualized in the drawing, which will correspond to the height of the manifold/channel etc. The plates of FIG. 7a and FIG. 7b are used to form the coupling between separate layer-multipliers. Sandwiching a plate of FIG. 7d between two plates according to FIG. 7c of which one is flipped as compared to the view of FIG. 7c will form a layer multiplier, meaning that only two types of plates are needed in order to form the main operational portion of the layer multiplier, three if the element of FIG. 7b is counted. When using this construction it is obvious that there should preferably be an even number of splitting channels for each lateral half of the layer multiplier, for reasons of symmetry. In the embodiment of FIGS. 6 and 7 the number is 6, yet other embodiment embraces the use of 2, 4, 8, or splitting channels per half, although other numbers are possible too. The suggested number of splitting channels should not be limited by these specific examples, since the inventive idea is not limited to a specific number of channels per se.

The plates or elements may be machined from a homogenous plate, a moulded plate or in any other suitable way. The material used may vary with application (i.e. the properties of the material being processed in the layer multiplier). We consider the choice of material to be obvious to the skilled person presented with the disclosure of the present invention and the parameters relevant for the material to be processed.

Features common for all embodiments are that the distribution manifold is arranged to guide the flowable material in a radial direction, outwards from the splitting channels to the outlet, that each splitting channel is arranged to guide the flowable material from the distribution manifold to the recombination manifold, generally in an axial direction (orthogonal to the radial direction), and that the recombination manifold is arranged to guide the flowable material in a radial direction, inwards from the splitting channels to the outlet. The splitting channels provides more than guiding the flowable material in an axial direction (corresponding to the orthogonal direction previously described), yet this feature in combination with the features of the distribution chamber and the recombination chamber vouches for a layer multiplier having an excellent volume efficiency in terms of using the volume the device would occupy, and also a layer multiplier being able to provide a good multiplication ratio per axial length of the device.

Tests and Results

In order to assess the quality of the new mixer design its performance is compared to that of two others: the Kenics mixer as the standard and the DentIncx mixer. Detailed information of these mixers is available, e.g. via the Internet, yet since they do not represent relevant prior art they will not be discussed in detail here. The mixer of an embodiment of the present invention is referred to as the PeelIncx mixer For the same mixing quality (number of striations), geometries are adapted to have the same total volume, channel cross section, or length, while the pressure drop is used as criterion. Mixing quality is related to the number and uniformity of the layers formed during the mixing operation. A comparison was made between these three mixers for the same mixing quality, expressed in producing the same number of half a million layers. If we start with two layers at the entrance of the mixer and n is the number of elements, the number of layers formed, and number of elements needed to produce 500.000 layers, equal:

TABLE 1

Efficiency in layer production

| Type | # layers for n elements | # elements for $5 \times 10^5$ layers |
|---|---|---|
| Kenics | $2 \times 2^n$ | 18 |
| DentIncx | $2 \times 4^n$ | 9 |
| PeelIncx | $2 \times 12^n$ | 5 |

The reference geometry is the PeelIncx mixer with 4 mm channel width (and height), 40 mm outer diameter, 12 splitting channels and 22 mm element thickness, which is compared, subsequently, to mixers with the same volume, the same channel height and the same length, using the pressure drop as the criterion. Calculations were performed with the Moldflow package. We start with mixers with the same total mixing volume of 40 cc. For the PeelIncx we need 5 elements, se table above, thus a total length of 110 mm. The geometrical scaling of the DentIncx mixer is as follows: Let a be the height and width of the square entrance channel, then the total height of the mixer is 2a, the total width 4a, and the length per element 7a. With 9 elements needed we find for a total volume of 40 cc roughly a=5 mm. Finally, for the Kenics mixer we need 18 elements, while per element L/D–1.5 and therefore L=18*1.5 D=27 D; the volume equals $\pi D^2/4 \times L = 40{,}000$ mm$^3$, which combined leads to D=12.5 rnm (approximately) for this 40 cc mixer. The pressure drops needed to maintain the flow through the mixers, show that Kenics and PeelIncx are comparable, while the DentIncx is considerably less efficient:

TABLE 2

Pressure consumption and dimensions of mixers with 40 cc volume and a 5 × 10$^5$ layered output. Simulated with a flow of 1 cc/s and a viscosity of 1000 Pas.

| Type | Pressure consumption/MPa | Dimensions/mm | Volume/cc |
| --- | --- | --- | --- |
| Kenics | 5 | Ø 13.5 × 370 | 40 |
| DentIncx | 11 | 20 × 10 × 320 | 40 |
| PeelIncx | 5 | Ø 40 × 110 | 40 |
| PeelIncx(lp) | 3.5 | Ø 39 × 106 | 40 |

It should be noticed that about 80% of the PeelIncx's pressure consumption takes place in the transition element (the coupling element). Making the channels locally larger is an opportunity to partly solve this issue. This is illustrated with the PeelIncx(lp) version, in which locally in the transition area the channel width and height are increased from 4 mm to 6 mm, to lower the total pressure drop there (index lp, low pressure), see Table 2 bottom line. Finally it is concluded that both PeelIncx designs obtain the mixing result using only ⅓ of the length of the others. In the new designs, energy efficient mixing, using low pressure drops only, is therefore combined with compactness.

Next we take the channel dimensions constant and chose 4 mm as the standard. Clearly the PeelIncx has the lowest pressure drop, and is therefore the most energy efficient one, but it has the largest volume, see Table 3 below

TABLE 3

Pressure consumption, dimensions and volume of mixers with 4 mm minimal channel height and a 5 × 10$^5$ layered output. Simulated with a flow of 1 cc/s and a viscosity of 1000 Pas.

| Type | Pressure consumption/MPa | Dimensions/mm | Volume/cc |
| --- | --- | --- | --- |
| Kenics | 9 | Ø 10 × 370 | 15 |
| DentIncx | 18 | 15 × 8 × 275 | 16 |
| PeelIncx | 5 | Ø 40 × 110 | 40 |

Finally, we consider the case of a fixed available length for mixing, 110 nm in this example. Again the PeelIncx shows the lowest energy consumption given the low pressure drop, but in this case the volume it needs is more than an order in magnitude larger compared to both others that are remarkably equal, see Table 4 below.

TABLE 4

Pressure consumption, dimensions and volume of different mixers with a 110 mm length and a 5 × 10$^5$ layered output. Simulated with a flow of 1 cc/s and a viscosity of 1000 Pas.

| Type | Pressure consumption/MPa | Dimensions/mm | Volume/cc |
| --- | --- | --- | --- |
| Kenics | 16 | Ø 4.1 × 110 | 1.1 |
| DentIncx | 45 | 6.5 × 3.5 × 110 | 1.3 |
| PeelIncx | 5 | Ø 40 × 110 | 40 |

Of course, the volume used in the PeelIncx mixer, directly depends on its outer diameter, D. Keeping the feed channel cross section constant, a$^2$, and letting those of the splitting channels be identical to the feed channel, thus also a$^2$, increasing the diameter, D, of the mixer increases the number of splitting channels that can be placed at its circumferential. Realizing that every splitting channel needs a space of 3 times its width the number of splitting channels, and thus the number of layers produced in each element, scales with $\pi D/3a$ which is roughly –D/a. The number of elements needed to produce a desired number of layers therefore decreases with increasing D. The pressure drop also decreases with increasing diameter, and can be calculated based on scaling arguments of pressure throughput relations in standard geometries, while the mixer's volume increases. Of course also the opposite is true. Therefore the disadvantage of a too large volume can indeed be solved by decreasing the outer diameter of the mixer, D, but at the cost of energy use, as expressed in the pressure consumption Conclusions A compact mixer has been designed, manufactured, and optimized with a working principle that is based on multiple splitting and recombining operations. Its working efficiency is compared to that of two other static mixers, the standard Kenics mixer, renowned for its low energy consumption, given its low pressure drop (roughly 5.5 times more than an empty pipe of the same dimensions), but also characterized by its long length, and a recent optimized splitting serpentine mixer, the DentIncx mixer, characterized by its ease of fabrication. We find that, for the same mixer volume, the new mixer, PeelIncx, and the Kenics show the same low pressure drop, while the new design uses only one third of the length. Locally increasing the channel size in the coupling element (where 80% of the pressure is consumed) somewhat, easily improves the energy consumption of the new mixer. Comparing performance for mixers with the same characteristic main channel dimensions, in terms of channel width and height, the new mixer outperforms the two others in terms of pressure consumption and compactness.

Similarly, if we compare mixers of the same length, given a prescribed total length available for mixing, the PeelIncx uses three times less pressure than the Kenics and nine times less than the DentIncx. This goes, however, at the cost of its volume that is in this case 30 times larger than that of both other mixers. Decreasing the mixer's volume keeping its length constant, strongly and directly increases the pressure needed to maintain the flow and is, therefore, no real option since its advantage then disappears. But by locally increasing the short channels in the coupling elements, pressure consumption can be decreased, and lower volumes at the same pressure drop are in reach.

Examples of polymer combinations which may be accomplished using the present multiplier includes, but are not limited to: LDPE/mPE, LDPE/MDPE, LDPE narrow MWD/LDPE broad MWD, LDPE/PP, LDPE/EVOH, LDPE/LCP, and LDPE/polyolephine-elastomers. There are several advantages in increasing the number of layers in a multilayer structure, one being that a defect in a single layer will have less impact for the overall properties of the multilayer structure.

The skilled person realizes that the embodiments are only specific examples, which should not be construed as limiting. The skilled person also realize that the purpose of the reference numbers used in the claims are to facilitate understanding, and that they should not be construed as limiting in any way.

In all drawings there are two components only (one black and one white), and each layer is of equal thickness. The skilled person realizes that a larger number of components may be used, and that the layers do not have to be of equal thickness.

The invention claimed is:

1. A layer multiplier for generation of a high-viscosity multilayered structure, comprising:
    an inlet for a flow of multilayered-flowable material;
    a distribution manifold into which the inlet debouches, the distribution manifold extending in a first circular direction about a central axis of the layer multiplier and having a first length defining a portion of a first circumference;
    two or more separate splitting channels extending from the distribution manifold;
    a recombination manifold into which each splitting channel is separately and sequentially connected along a length of the recombination manifold, the recombination manifold extending in a second circular direction about the central axis and having a second length defining a portion of a second circumference; and
    an outlet in one end of the recombination manifold, the outlet and the inlet being arranged nearer the central axis than the splitting channels;
    wherein the recombination manifold is configured to recombine an output flow from each sequentially connected splitting channel along the length of the recombination manifold to increase the number of layers in the multilayered-flowable material, producing the high-viscosity multilayered structure flowing to the outlet.

2. The layer multiplier of claim 1, wherein the splitting channels are connected along the length of the recombination manifold in a flow direction of the flowable material.

3. The layer multiplier of claim 1, wherein the splitting channels are distributed along a remote end of the distribution manifold relative to the inlet.

4. The layer multiplier of claim 1, wherein
    the layer multiplier has a curved shape and the length is a dimension of the curved shape.

5. The layer multiplier of claim 1, wherein
    the distribution manifold is arranged to guide the flowable material in a radial direction, outwards from the splitting channels to the outlet, wherein each splitting channel is arranged to guide the flowable material in an axial direction, from the distribution manifold to the recombination manifold, and wherein the recombination manifold is arranged to guide the flowable material in the radial direction, inwards from the splitting channels to the outlet.

6. The layer multiplier of claim 1, said multiplier comprising two identical halves arranged in a mirrored relationship, each half comprising a distribution manifold, splitting channels, and a recombination-manifold.

7. The layer multiplier of claim 1, wherein the number of splitting channels is between 4-20.

8. The layer multiplier of claim 1, further comprising two identical distribution manifolds arranged in a mirrored relationship and two identical recombination manifolds arranged in a mirrored relationship.

9. The layer multiplier of claim 1, wherein the shape of the recombination manifold and the shape of the distribution manifold are the same.

10. The layer multiplier of claim 1, further comprising two plates with through-openings.

11. A layer-multiplier assembly, comprising several layer multipliers of claim 1, arranged on top of each other, and provided with a coupling element therebetween.

12. The layer multiplier assembly of claim 11, wherein adjacent layer multipliers are rotated 90°.

13. The layer multiplier of claim 9, wherein the shape of the recombination manifold is identical to the shape of the distribution manifold.

14. The layer multiplier of claim 1, wherein each splitting channel deflects at a right angle as it deflects.

15. The layer multiplier of claim 1, wherein the distribution manifold is arranged in an opposing relationship with the recombination manifold in the sense that the two manifolds face each other and the recombination manifold is positioned in a direction normal to an interface surface between adjacent layers of the multilayered flowable material in the distribution manifold.

16. The layer multiplier of claim 1, wherein the first circular direction is the same as the second circular direction.

17. The layer multiplier of claim 1, wherein the first circumference is a different length than the second circumference.

* * * * *